United States Patent
Nagano

(10) Patent No.: US 10,675,802 B2
(45) Date of Patent: Jun. 9, 2020

(54) INJECTION MOLDING SYSTEM

(71) Applicant: FANUC Corporation, Yamanashi (JP)

(72) Inventor: Yasumasa Nagano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 236 days.

(21) Appl. No.: 15/339,932

(22) Filed: Nov. 1, 2016

(65) Prior Publication Data

US 2017/0120494 A1     May 4, 2017

(30) Foreign Application Priority Data

Nov. 2, 2015  (JP) ................................. 2015-216013

(51) Int. Cl.
| | |
|---|---|
| *B29C 45/84* | (2006.01) |
| *B29C 45/17* | (2006.01) |
| *B29C 45/66* | (2006.01) |
| *B29C 45/50* | (2006.01) |

(52) U.S. Cl.
CPC .......... *B29C 45/84* (2013.01); *B29C 45/1774* (2013.01); *B29C 45/66* (2013.01); *B29C 45/661* (2013.01); *B29C 45/5008* (2013.01); *B29C 2045/1792* (2013.01); *B29C 2045/665* (2013.01); *B29C 2945/7623* (2013.01); *B29C 2945/76083* (2013.01); *B29C 2945/76103* (2013.01); *B29C 2945/76163* (2013.01); *B29C 2945/76187* (2013.01); *B29C 2945/76464* (2013.01)

(58) Field of Classification Search
CPC .......... B29C 2945/76083; B29C 2945/76086; B29C 2945/7609; B29C 2945/76093; B29C 2945/76096
See application file for complete search history.

(56) References Cited

FOREIGN PATENT DOCUMENTS

| CN | 104647713 A | 5/2015 |
|---|---|---|
| DE | 102014017129 A1 | 5/2015 |
| JP | 10-234155 A | 9/1998 |
| JP | 2001-58342 A | 3/2001 |
| JP | 2005-201390 A | 7/2005 |
| JP | 2013-38339 A | 2/2013 |
| JP | 2015-100990 A | 6/2015 |

OTHER PUBLICATIONS

Office Action in JP Application No. 2015-216013, dated Sep. 26, 2017, 6pp.

*Primary Examiner* — Ryan M Ochylski
(74) *Attorney, Agent, or Firm* — Hauptman Ham, LLP

(57) ABSTRACT

In order to calculate a ball screw abrasion amount of an injection-axis ball screw or a mold-clamping-axis ball screw, a position of a ball nut fitted to the ball screw is photographed by a camera installed in an injection molding machine. Then, if the photographed position of the ball nut is found, as a result of analysis of an image captured by the camera, to be deviated from the position of the ball nut when a ball screw has no abrasion, it is determined that the ball screw is abraded.

5 Claims, 2 Drawing Sheets

INJECTION MOLDING SYSTEM

RELATED APPLICATIONS

The present application claims priority to Japanese Patent Application Number 2015-216013, filed Nov. 2, 2015, the disclosure of which is hereby incorporated by reference herein in its entirety.

BACKGROUND OF THE INVENTION

1. Field of the Invention

The present invention relates to an injection molding system that generates power by a power generation device such as a servo motor and transmits the power by means of a transmission mechanism.

2. Description of the Related Art

In general, an injection molding machine includes an injecting section and a clamping section. The injecting section is provided with an injection-axis servo motor which generates power during a resin injection operation and a transmission mechanism which converts a rotational motion of the injection-axis servo motor into a linear motion. Similarly to the injecting section, the clamping section is provided with a mold-clamping-axis servo motor which generates power during a clamping operation, a transmission mechanism which converts a rotational motion of the mold-clamping-axis servo motor into a linear motion, a protrusion-axis servo motor which generates power during a protrusion operation, and a transmission mechanism which converts a rotational motion of the protrusion-axis servo motor into a linear motion.

An operation of the injection molding machine will be described with reference to FIG. 1.

The injection molding machine is installed on a pedestal 1 and includes an injecting section and a clamping section as described above. The injecting section includes an injection cylinder 60 and a hopper 66 which supplies resin to the injection cylinder 60. A nozzle 62 is provided at a front end of the injection cylinder 60 and a screw 64 is provided inside the injection cylinder 60. Further, when an injection-axis ball screw 30a is rotationally driven by the rotation of the injection-axis servo motor 34a, the injection cylinder 60 is operated to move forward and backward with respect to a fixed platen 44 (and a fixed die 48 attached to the fixed platen 44).

Further, the clamping section includes a movable platen 42, a movable die 46 which is attached to the movable platen 42, a toggle mechanism 36 for performing mold clamping of the movable platen 42, a mold-clamping-axis servo motor 34b, and a mold-clamping-axis ball screw 30b. The mold-clamping-axis ball screw 30b is rotationally driven by the rotation of the mold-clamping-axis servo motor 34b. Accordingly, the toggle mechanism 36 is driven so that the movable platen 42 moves in the front-back direction. When the movable platen 42 is moved toward the fixed platen, the movable die 46 attached to the movable platen 42 touches the fixed die 48 attached to the fixed platen 44 so that a clamping operation is performed.

Further, the resin inside the hopper 66 is supplied into the injection cylinder 60 and the resin is carried while being stirred by the screw 64 and heated by a heater (not shown). The resin which is melted by heating is injected into the mold from the front end of the nozzle 62 which comes into press-contact with the fixed die 48. Subsequently, the mold (the movable die 46 and the fixed die 48) is clamped by the driving of the toggle mechanism 36 so that a molded article is molded. Subsequently, the mold is opened by the driving of the toggle mechanism 36 and the protrusion-axis ball screw 30c is rotationally driven by the rotation of the protrusion-axis servo motor 34c so that the protrusion shaft 43 protrudes. Accordingly, the molded article is caused to protrude outward from the mold.

In this way, the servo motor 34 and the ball screw 30 are used at many locations of the injection molding machine including the injecting section, the clamping section, and the molded-article protruding section. There is a case where the transmission mechanism such as the ball screw 30 may be abraded due to a load repeatedly applied thereto. When the abrasion state becomes severe, the ball screw 30 is not smoothly driven and thus a molding failure may occur. Further, when the transmission mechanism is continuously used in the abrasion condition, the ball or the screw thread of the ball screw 30 is abraded. Accordingly, there is concern that the transmission mechanism may be broken or a mechanical problem may occur in the injection molding machine.

When the molding failure or the mechanical problem occurs as described above, quality or productivity in a production site is influenced. Here, when the transmission mechanism abrasion state can be checked, the quality of the molded article can be effectively kept or the maintenance of the machine can be effectively performed.

Japanese Patent Application Laid-Open No. 10-234155 discloses a mechanism that transmits power of an electric servo motor by means of a trapezoid screw, wherein measurement units are provided in the trapezoid screw and a screw nut engaging with the trapezoid screw, respectively, and a screw abrasion amount is measured based on the difference between the scale markings of the measurement units. However, in this technique, since there is a need to provide the measurement unit for measuring the abrasion amount at both the ball screw and the screw nut, there is concern that the number of the measurement units may increase.

Further, Japanese Patent Application Laid-Open No. 2005-201390 discloses an injection molding machine including a driving motor for molding, a ball screw assembly which receives a rotation of the driving motor to convert a rotational motion into a linear motion, a detector which detects a rotation angle of the driving motor, a driven part which moves according to a linear motion, and a position defining member that defines a reference position of the driven portion, wherein an abrasion state of the ball screw assembly is detected by comparing a rotation angle of the driving motor, detected by the detector when the driven part is located at the reference position, with a reference rotation angle which is obtained previously. However, in this technique, there is a need to provide the position defining member for defining the reference position of the driven part in order to detect the abrasion state of the ball screw.

Japanese Patent Application Laid-Open No. 2001-58342 discloses a technique of detecting an abrasion state of a ball screw by visually checking a temperature of a nut of a driving ball screw, a lubricating grease state periodically sampled from the ball screw, a galling degree of a surface of a ball in a driving system of an electric injection molding machine. However, in this technique, since the ball nut temperature, the lubricating grease state, and the ball surface galling state are visually checked to indirectly check the abrasion state of the ball screw, the abrasion state of the ball screw can be checked, but the abrasion amount cannot be directly checked.

SUMMARY OF THE INVENTION

Here, an object of the invention is to provide an injection molding system capable of preventing a molding failure or a mechanical problem by directly measuring a ball screw abrasion amount with a small number of members.

According to the invention, there is provided an injection molding system including: a servo motor; a transmission mechanism converting a rotational motion of the servo motor into a linear motion; a transmission mechanism photographing unit for photographing the transmission mechanism; and a position calculation unit for analyzing image data photographed by the transmission mechanism photographing unit and calculating a position of the transmission mechanism.

According to the invention, since the transmission mechanism is photographed by the transmission mechanism photographing unit and the photographed image data is analyzed to calculate the position of the transmission mechanism, it is possible to directly measure the ball screw abrasion amount by a small number of members.

The injection molding system may further include a comparison unit for comparing a position coordinate obtained by converting a rotation position of the servo motor into a position of the transmission mechanism with a position coordinate calculated by the position calculation unit. Since the position coordinate obtained based on the rotation position of the servo motor is compared with the position coordinate calculated by the photographing of the transmission mechanism photographing unit, it is possible to calculate a difference in position of the transmission mechanism caused by abrasion by comparing the position coordinate in a normal state without abnormality such as abrasion with the position coordinate calculated by the position calculation unit.

The injection molding system may further include a photographing position moving unit for moving a photographing position of the transmission mechanism photographing unit. Since the photographing position moving unit for moving the photographing position of the transmission mechanism photographing unit is provided, it is possible to photograph a plurality of positions of the transmission mechanism by the transmission mechanism photographing unit fewer than the transmission mechanisms. Accordingly, it is possible to decrease the number of devices used to measure the abrasion amount of the transmission mechanism.

The injection molding system may further include an alarm unit configured to issue an alarm when a difference between the position coordinate obtained by converting the rotation position of the servo motor into the position of the transmission mechanism and the position coordinate calculated by the position calculation unit exceeds a predetermined amount. Since an alarm is generated when a difference between the position coordinate obtained based on the rotation position of the servo motor and the position coordinate obtained by the photographing of the transmission mechanism photographing unit exceeds a predetermined amount, it is possible to generate an alarm when the abrasion amount of the transmission mechanism exceeds the predetermined amount and thus to prevent a molding failure or a mechanical problem in advance.

The injection molding system may further include a display unit for displaying the difference between the position coordinate obtained by converting the rotation position of the servo motor into the position of the transmission mechanism and the position coordinate calculated by the position calculation unit. Since a difference between the position coordinate obtained based on the rotation position of the servo motor and the position coordinate calculated by the photographing of the transmission mechanism photographing unit is displayed on the display unit, it is possible to recognize an abrasion degree by a numerical value and thus to easily prevent a molding failure or a mechanical problem in advance.

The photographing position moving unit may be a robot.

A molded article extracting unit for extracting a molded article may be attached to the photographing position moving unit. Since the molded article extracting unit for extracting a molded article may be attached to the photographing position moving unit, it is possible to move both the transmission mechanism photographing unit and the molded article extracting unit by a small number of photographing position moving units.

According to the invention, it is possible to provide the injection molding system capable of preventing a molding failure or a mechanical problem by directly measuring a ball screw abrasion amount with a small number of members.

BRIEF DESCRIPTION OF THE DRAWINGS

The forgoing and other objects and feature of the invention will be apparent from the following description of preferred embodiments of the invention with reference to the accompanying drawings, in which:

FIG. 3A illustrates a normal state without a ball screw abrasion amount and FIG. 3B illustrates a state with a ball screw abrasion amount.

DETAILED DESCRIPTION OF THE PREFERRED EMBODIMENTS

An injection molding system of the invention includes an injection molding machine and detecting means for photographing a transmission mechanism converting a rotational motion of a servo motor in the injection molding machine into a linear motion and detecting a transmission mechanism abrasion state from photographed image data.

Figure 1:
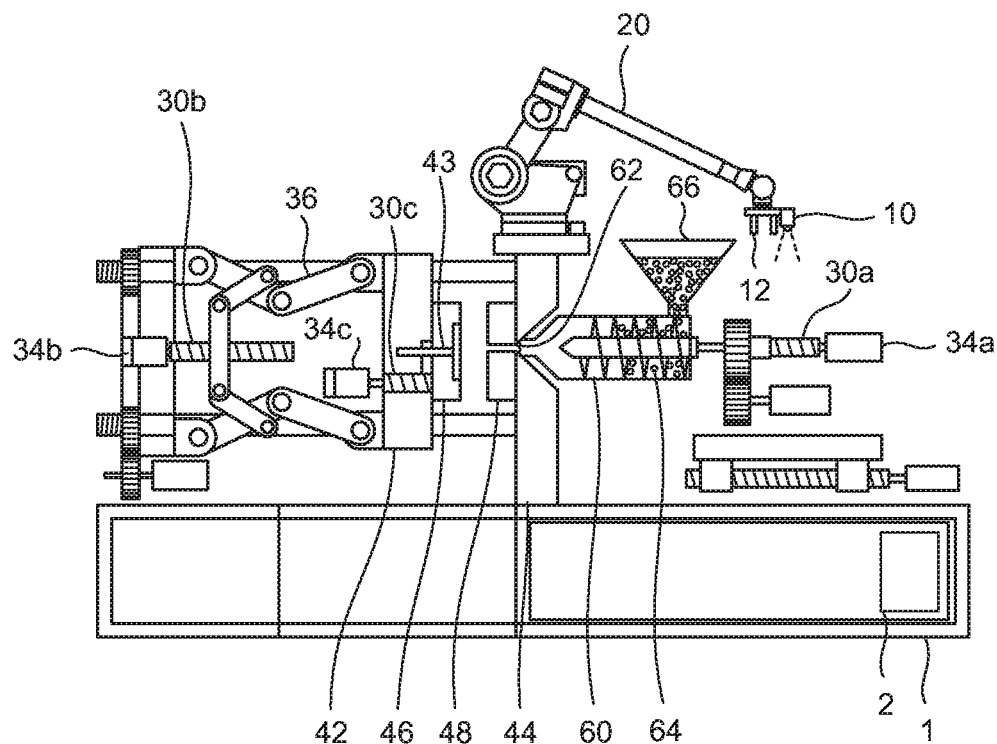
FIG. 1 is a diagram illustrating an embodiment of an injection molding system of the invention and illustrates a state where an injection-axis ball screw abrasion amount is measured by a camera attached to a robot fixed to a fixed platen of an injection molding machine.

According to the embodiment of the invention, as illustrated in FIG. 1, a multi-joint robot 20 is fixed onto a fixed platen 44 of the injection molding machine. A camera 10 and a molded article extractor 12 are attached to the multi-joint robot 20 at a front end thereof.

Figure 2:
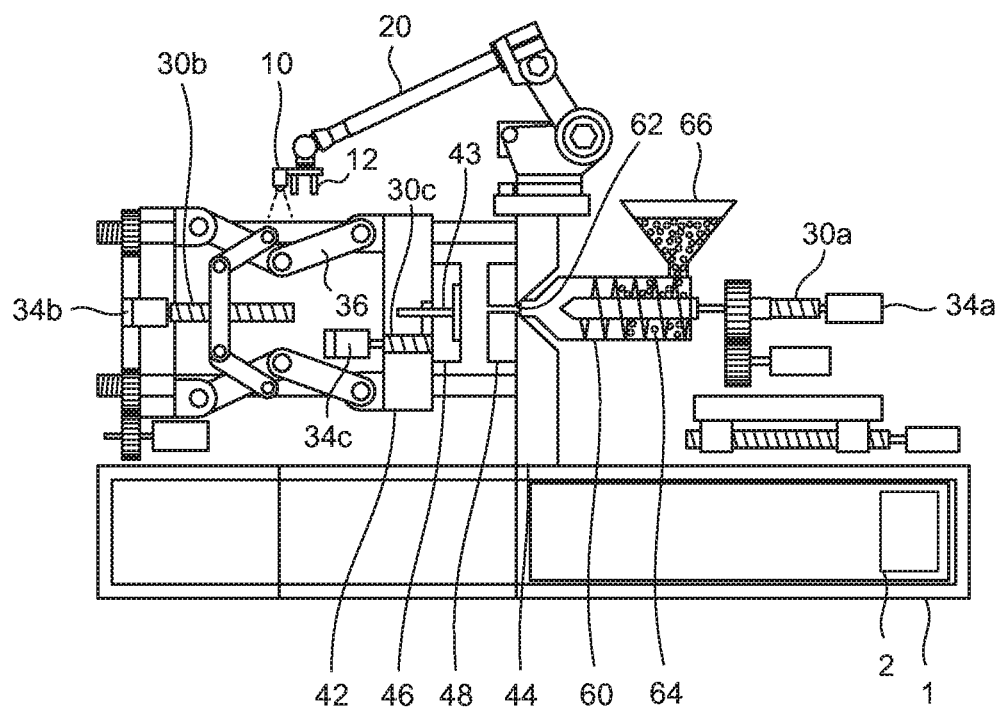
FIG. 2 is a diagram illustrating a state where a mold-clamping-axis ball screw abrasion amount is measured by the camera of FIG. 1.

The molded article extractor 12 is used to extract an article molded by the injection molding machine. The camera 10 is used to photograph ball screws provided inside the injection molding machine. Since the camera 10 is provided at the front end of the multi-joint robot 20, the posture of the camera can be easily changed. Accordingly, the camera 10 can be moved to various locations and one camera 10 can photograph image data for calculating the ball screw abrasion amounts at a plurality of locations. FIG. 1 illustrates a state where an injection-axis ball screw 30*a* is photographed by the camera 10 provided in the front end of the multi-joint robot 20 and FIG. 2 illustrates a state where a mold-clamping-axis ball screw 30*b* is photographed by the camera 10.

The image data which is photographed by the camera 10 is processed by a controller (not shown) of the multi-joint robot 20, a controller (not shown) of the injection molding machine, or a centralized control system. A display may be provided in the injection molding machine so that a calculation value at a certain position based on the image data or a process result of the controller may be displayed thereon. Further, in FIGS. 1 and 2, an example is illustrated in which the camera 10 is fixed to the multi-joint robot 20. However, the camera may be fixed at a position other than in the multi-joint robot 20. For example, the camera may be fixed to the injection molding machine body.

Figure 3A:
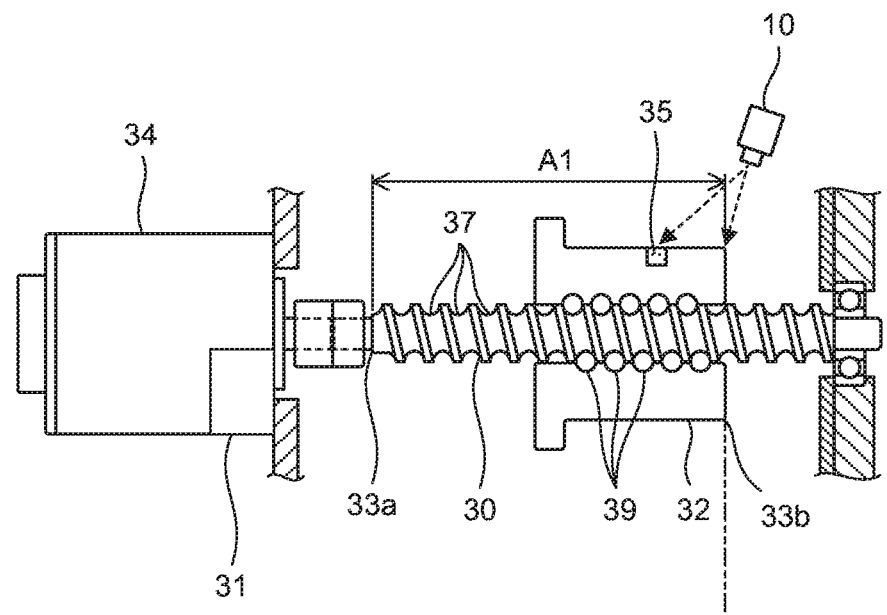
FIGS. 3A and 3B are diagrams illustrating an operation of calculating a ball screw abrasion amount of the injection molding machine by the use of the camera of FIG. 1, where
Figure 3B:
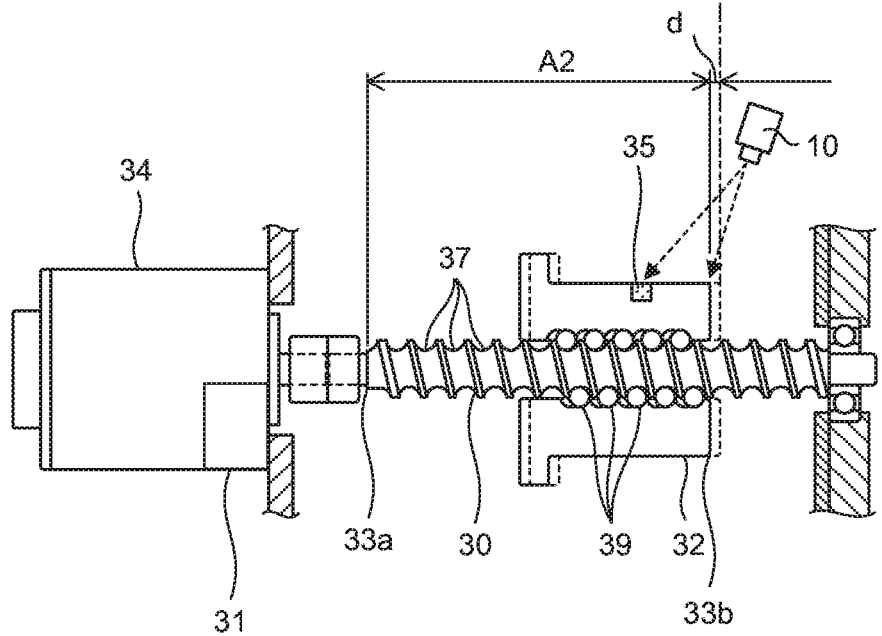

FIGS. 3A and 3B are enlarged views illustrating the ball screw in order to describe a method of calculating the ball screw abrasion amount of the injection-axis ball screw 30*a* or the mold-clamping-axis ball screw 30*b*, where FIG. 3A illustrates a state where the ball screw is normal and FIG. 3B illustrates a state where the ball screw is abraded.

The ball screw 30 is connected to a servo motor 34 and the ball screw 30 is also rotated with the rotation of the servo motor 34. A ball nut 32 is fitted to the ball screw 30 and a ball 39 is nipped between the ball nut 32 and a groove portion 37 of the ball screw 30. Accordingly, the ball nut 32 moves in the central axis direction of the ball screw 30 in accordance with the rotation of the ball screw 30 caused by the rotation of the servo motor 34.

Further, a mark 35 is formed on the ball nut 32 at a position thereof and the position of the mark 35 serving as a reference is stored in advance. Then, the position of the ball nut 32 is calculated from the position of the mark 35 in the image photographed by the camera 10.

Next, a method of calculating the abrasion amount of the ball screw 30 will be described. The ball nut 32 is photographed by the camera 10, the image of the ball nut 32 is analyzed, and the position of the ball nut 32 is obtained from the analysis result of the image. Then, the abrasion amount of the ball screw 30 is calculated from a change in the obtained position of the ball nut 32.

In the examples illustrated in FIGS. 3A and 3B, the end of the ball screw 30 near the servo motor 34 is set as an original point used when the rotation position of the servo motor 34 is converted into the position of the ball screw 30 and is also set as an original point used when the position of the ball screw 30 is obtained by the camera 10. In order to detect the rotation position of the servo motor 34, a position detector 31 provided in the servo motor 34 can be used.

As illustrated in FIG. 3A, in the normal state where the ball screw 30 is not abraded, a distance between an end 33*b* of the ball nut 32 and an end 33*a* of the ball screw 30 obtained from the position information based on the rotation position of the servo motor 34 is equal to a distance A1 between the end 33*b* of the ball nut 32 and the end 33*a* of the ball screw 30 obtained from the position information of the ball nut 32 based on the mark 35 photographed by the camera 10.

When the ball screw 30 is abraded due to the usage thereof, the ball 39 or the groove portion 37 of the ball screw 30 is abraded and thus the engagement between the ball 39 and the groove portion 37 becomes loose. As a result, the distance between the end 33*b* of the ball nut 32 and the end 33*a* of the ball screw 30 obtained from the position information of the ball nut 32 based on the mark 35 photographed by the camera 10 becomes A2 instead of A1. Meanwhile, since the distance between the end 33*b* of the ball nut 32 and the end 33*a* of the ball screw 30 obtained from the position information based on the rotation position of the servo motor 34 is obtained only by the relation between the lead of the ball screw 30 and the rotation position of the servo motor 34, the distance becomes A1. For that reason, since a difference between the distance A1 and the distance A2 is obtained as illustrated in FIG. 3B, it is possible to detect a difference from the original position of the ball nut 32 or the ball screw 30, that is, the abrasion amount of the ball screw 30. Further, a difference d in position coordinate which is a difference between A1 and A2 may be displayed on a display device 2 provided in the injection molding machine. Accordingly, an operator can easily recognize a detailed positional deviation amount.

When the position of the ball nut 32 is calculated by the camera 10, the position of the ball nut 32 is obtained by using the mark 35 formed on the ball nut 32 in the case of the embodiment. However, the mark 35 may not be essentially used. For example, the position of the ball nut 32 can be calculated in such a manner that a specific part (the end, the corner, or the like) of the ball nut 32 is set and is photographed by the camera 10.

Further, the position of a return tube of the ball nut 32 may be obtained from the analysis result of the image of the ball nut 32, and the installation position of the ball nut 32 to a movable member may be obtained from the analysis result of the image of the ball nut 32.

Additionally, when the ball screw 30 is abraded by a predetermined amount, the possibility of the molding failure or the mechanical problem of the ball screw 30 increases. For this reason, if a predetermined value is set in advance in the abrasion amount and an alarm is displayed on the display device 2 when the abrasion amount reaches the predetermined value in order to notify an alarm to an operator by the display of the alarm, the operator can be certainly informed of the molding failure or the mechanical problem. Additionally, the alarm unit is not limited to the display on the display device 2 and the alarm may be generated by a lamp or sound.

Further, in the embodiment, a member to which the camera 10 is attached is a multi-joint robot 20, but the robot may not be essentially used. Although the degree of freedom in movement is slightly limited compared with the robot, a movement mechanism may be used other than the robot.

The invention claimed is:
1. An injection molding system, comprising:
  a servo motor;
  a transmission mechanism configured to convert a rotational motion of the servo motor into a linear motion;
  a transmission mechanism photographing unit configured to photograph the transmission mechanism;
  a position calculation unit configured to analyze image data photographed by the transmission mechanism photographing unit and calculate a position of the transmission mechanism;
  a position detector provided in the servo motor and configured to detect a rotation position of the servo motor; and
  a comparison unit configured to compare
    (1) a first position coordinate obtained by converting the rotation position of the servo motor into a posi- tion of the transmission mechanism, the rotation position being detected by the position detector, with (2) a second position coordinate calculated by the position calculation unit by analyzing the image data photographed by the transmission mechanism photographing unit.

2. The injection molding system according to claim 1, further comprising:

an alarm unit configured to issue an alarm in response to a determination that a difference between the first position coordinate obtained by converting the rotation position of the servo motor into the position of the transmission mechanism and the second position coordinate calculated by the position calculation unit exceeds a predetermined amount.

3. The injection molding system according to claim 1, further comprising:

a display unit configured to display a difference between the first position coordinate obtained by converting the rotation position of the servo motor into the position of the transmission mechanism and the second position coordinate calculated by the position calculation unit.

4. The injection molding system according to claim 1, wherein the transmission mechanism comprises a screw and a nut engaged with the screw, the nut comprises a mark, a position of the mark on the nut is stored in advance as a reference, and the position calculation unit is configured to calculate a position of the nut, as the position of the transmission mechanism, from the position of the mark in the image data photographed by the transmission mechanism photographing unit.

5. An injection molding system, comprising:

a servo motor;

a transmission mechanism configured to convert a rotational motion of the servo motor into a linear motion;

a camera configured to photograph the transmission mechanism;

a position detector provided in the servo motor and configured to detect a rotation position of the servo motor; and a controller programmed to analyze image data photographed by the camera, calculate a position of the transmission mechanism from the analyzed image data, and compare (i) a first position coordinate of the transmission mechanism obtained by converting the rotation position of the servo motor into a position of the transmission mechanism, the rotation position being detected by the position detector, with (ii) a second position coordinate of the transmission mechanism calculated by analyzing the image data photographed by the camera.

\* \* \* \* \*